US011667110B2

(12) United States Patent
Cui et al.

(10) Patent No.: US 11,667,110 B2
(45) Date of Patent: Jun. 6, 2023

(54) THERMOREGULATION ARTICLES FOR EXTERIORS OF BUILDINGS

(71) Applicant: EEnotech, Inc., Sunnyvale, CA (US)

(72) Inventors: Yi Cui, Stanford, CA (US); Cindy Yee Cin Lau, Palo Alto, CA (US)

(73) Assignee: EEnotech, Inc., Sunnyvale, CA (US)

( * ) Notice: Subject to any disclaimer, the term of this patent is extended or adjusted under 35 U.S.C. 154(b) by 28 days.

(21) Appl. No.: 17/165,184

(22) Filed: Feb. 2, 2021

(65) Prior Publication Data
US 2021/0237413 A1 Aug. 5, 2021

Related U.S. Application Data

(60) Provisional application No. 62/969,596, filed on Feb. 3, 2020.

(51) Int. Cl.
*B32B 27/20* (2006.01)
*B32B 27/32* (2006.01)
*B32B 27/06* (2006.01)
*E04F 13/08* (2006.01)

(52) U.S. Cl.
CPC .............. *B32B 27/20* (2013.01); *B32B 27/06* (2013.01); *B32B 27/32* (2013.01); *E04F 13/0866* (2013.01); *B32B 2255/10* (2013.01); *B32B 2255/205* (2013.01); *B32B 2264/102* (2013.01); *B32B 2307/204* (2013.01); *B32B 2307/304* (2013.01); *B32B 2307/4026* (2013.01); *B32B 2307/416* (2013.01); *B32B 2419/00* (2013.01)

(58) Field of Classification Search
None
See application file for complete search history.

(56) References Cited

U.S. PATENT DOCUMENTS

| 4,340,634 | A | | 7/1982 | Pusch et al. | |
|---|---|---|---|---|---|
| 5,750,242 | A | * | 5/1998 | Culler | B32B 5/24 442/232 |
| 2005/0181203 | A1 | * | 8/2005 | Rawlings | B32B 38/0008 428/458 |
| 2009/0263644 | A1 | * | 10/2009 | Kelsey | B32B 5/24 428/315.9 |
| 2019/0008217 | A1 | | 1/2019 | Cui et al. | |
| 2019/0239586 | A1 | | 8/2019 | Cui et al. | |
| 2020/0353720 | A1 | | 11/2020 | Cui et al. | |

FOREIGN PATENT DOCUMENTS

JP  S55154155 A  12/1980

OTHER PUBLICATIONS

Nanophase, Product Specifications: Iron oxide, ate accessed: Aug. 12, 2022 <http://nanophase.com/products/iron-oxide/> (Year: 2022).*
Transmetra, Table of Emissivity of Various Surfaces, date accessed: Aug. 12, 2022 <https://www.transmetra.ch/images/transmetra_pdf/publikationen_literatur/pyrometrie-thermografie/emissivity_table.pdf> (Year: 2022).*
Bennett et al., Infrared Reflectance of Evaporated Aluminum Films:, Journal of the Optical Society of America, vol. 52, No. 11, Nov. 1962, pp. 1245-1250.
Cai et al., "Warming Up Human Body by Nanoporous Metallized Polyethylene Textile", Nature Communications, vol. 8, No. 496, Sep. 19, 2017, pp. 1-8.
Hass et al., "Optical Constants and Reflectance and Transmittance of Evaporated Aluminum in the Visible and Ultraviolet", Journal of the Optical Society of America, vol. 51, No. 7, Jul. 1961, pp. 719-722.
International Search Report and Written Opinion for PCT/US2021/0016197 dated May 4, 2021, 9 pages.

* cited by examiner

*Primary Examiner* — Cheng Yuan Huang

(57) ABSTRACT

A thermoregulation article includes a metal film, a polymer film disposed on the metal film, and a colorant film disposed on the metal film. The thermoregulation article has at least one side having an average reflectivity greater than 0.5 at a wavelength of 0.3-4 μm and an average emissivity less than 0.4 at a wavelength of 4-20 μm.

8 Claims, 3 Drawing Sheets

THERMOREGULATION ARTICLES FOR EXTERIORS OF BUILDINGS

CROSS-REFERENCE TO RELATED APPLICATION

This application claims the benefit under 35 U.S.C. 119(e) of U.S. Provisional Application No. 62/969,596, filed Feb. 3, 2020, the content of which is hereby incorporated in its entirety.

TECHNICAL FIELD

This disclosure is generally related to thermoregulation articles, and more specifically to thermoregulation articles for use on the exteriors of buildings.

BACKGROUND

Problems associated with the energy crises and climate change are becoming more critical and needs to be addressed. According to recent research, 15% of all electricity consumed globally is used to cool homes and offices, which in turn causes an increase of greenhouse gas emissions worldwide. Therefore, development of new technologies to reduce the energy demand of the buildings is needed.

Many strategies have been proposed to reduce energy consumption at building, particularly in summer. For example, more energy-efficient appliances, such as air conditioner or cooling towers, are proposed. Some strategies employ materials disposed in the interiors of buildings that can block sunlight or hot air.

SUMMARY

Described herein are thermoregulation articles for shielding buildings from excessive sunlight and hot air. The thermoregulation articles may be applied to exteriors of buildings.

In one aspect, a thermoregulation article includes a metal film, a polymer film disposed on the metal film, and a colorant film disposed on the metal film. At least one side of the thermoregulation article has an average reflectivity greater than 0.5 at a wavelength of 0.3-4 μm and an average emissivity less than 0.4 at a wavelength of 4-20 μm.

In some embodiments, the colorant film may be disposed on the polymer film. In some embodiments, the colorant film may be interposed between the metal film and the polymer film. The colorant film includes colorants comprising dye molecules and/or colorant particles having a diameter less than 4 μm. Further, the colorants can be infrared transparent. For example, the colorant particles includes one or more of ferric ferrocyanide, iron oxide, or silicon.

In some embodiments, the polymer film includes one or more of polyethylene or polypropylene or other infrared (IR) transparent materials. The polymer film may include embedded colorant particles. In some embodiments, the polymer film includes embedded dielectric particles. The embedded dielectric particles include one or more of $TiO_2$, ZnO, or $CaCO_3$. The embedded dielectric particles has a diameter less than 4 μm.

In another aspect, a thermoregulation article includes a polymer film and dielectric particles embedded in the polymer film. At least one side of the thermoregulation article has an average reflectivity greater than 0.5 at a wavelength of 0.3-4 μm and an average emissivity less than 0.4 at a wavelength of 4-20 μm.

In yet another aspect, a thermoregulation article including a polymer film, dielectric particles embedded in the polymer film, and a colorant film disposed on the polymer film. At least one side of the thermoregulation article has an average reflectivity greater than 0.5 at a wavelength of 0.3-4 μm and an average emissivity less than 0.4 at a wavelength of 4-20 μm. The colorant film includes one or more of ferric ferrocyanide, iron oxide, or silicon.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to thermoregulation articles for use in the exteriors of buildings. The thermoregulation articles may reflect sunlight to reduce sunlight transmission into the interior of the buildings and being absorbed by items in the buildings. When the buildings are surrounded by hot airs, the thermoregulation articles also reduce heat radiation into the buildings. The thermoregulation articles are configured to be durable against various climate environments and severe weathers. To be user friendly, the thermoregulation articles may include an adhesion layer or other mechanisms for attaching to the exteriors of buildings.

Figure 1:
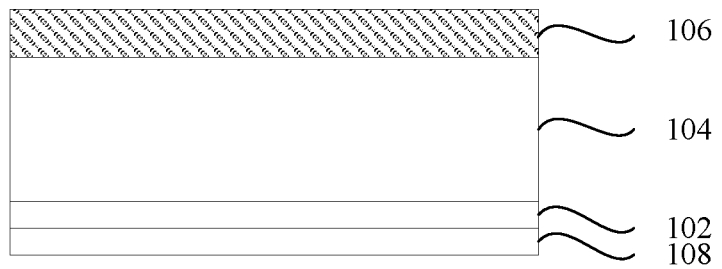
FIG. 1 is a cross-sectional view of a thermoregulation article according to one example embodiment.

Embodiments will now be explained with accompanying figures. Reference is first made to FIG. 1. FIG. 1 is a cross-sectional view of a thermoregulation article 100 according to one example embodiment. The thermoregulation article 100 includes a metal film 102, a polymer film 104 disposed on the metal film 102, and a colorant film 106 disposed on the polymer film 104. The thermoregulation article 100 has at least one side having an average reflectivity greater than 0.5 at a wavelength of 0.3-4 µm and an average emissivity less than 0.4 at a wavelength of 4-20 µm. In some embodiments, the thermoregulation article 100 has at least one side having an average reflectivity greater than 0.6, 0.7, or 0.75 at a wavelength of 0.3-4 µm to provide further capability to reflect sunlight. In some embodiments, the thermoregulation article 100 has at least one side having an average emissivity less than 0.35, 0.3, 0.25, or 0.2 at a wavelength of 4-20 µm to further reduce heat absorption. These characteristics can be obtained by selections of materials and film structures.

The metal film 102 may include any metals that has a high reflectivity for sunlight. Example metals for this purpose may include but not limited to Al, Ti, Cu, Ag, Au, etc. The metal film 102 may include a single layer of metal or alloy, or multi-layers of metals or alloys. A thickness of the metal film 102 may be a film less than 25 µm or a metallic coating less than 200 nm or 100 nm.

The polymer film 104 may include one or more layers of polymer(s) that is transparent or substantially transparent in the visible wavelength. In some instances, the polymer film 104 has transmittance of at least 0.3 in 0.3-20 µm wavelengths. For example, the polymer film 104 may include one or more of polyethylene or polypropylene. A thickness of the polymer film 104 may be less than 1000 µm. To improve the reflectivity of the thermoregulation article 100, in some instances, a thickness of the polymer film 104 may be further reduced. For example, a thickness of the polymer film 104 may be less than 750 µm, 500 µm, 400 µm, 300 µm, 200 µm, 150 µm, 140 µm, 130 µm, 125 µm, 120 µm, 110 µm, 100 µm, 75 µm, or 50 µm. The thickness of the polymer film 104 may further be selected in consideration of prolonging the life of the thermoregulation article 100. In some embodiments, the polymer film 104 may have a thickness of any of the above two thicknesses, such as 150 µm-50 µm, 150 µm-75 µm, 150 µm-100 µm, 150 µm-110 µm, 140 µm-50 µm, 140 µm-75 µm, 140 µm-100 µm, 140 µm-110 µm, 130 µm-50 µm, 130 µm-75 µm, 130 µm-100 µm, 130 µm-110 µm, 125 µm-50 µm, 125 µm-75 µm, 125 µm-100 µm, or 125 µm-110 µm.

The polymer film 104 may be a multi-layered structure. For example, the polymer film 104 may include a plurality of same polymer layers or polymer layers of different materials. In one instance, the polymer film 104 includes multiple layers of nanoporous-polyethylene or nanoporous-polypropylene. Each of the nanoporous-polymer layers may include nano-fibers tangled with each other to form pores therebetween or include nano-pores to create porous structure. In some instances, due to the pores, the polymer film 104 may have a 40% porosity. Depending on size of the pores, they could provide opacity in the visible range as well.

The colorant film 106 provides the thermoregulation article 100 with different colors to satisfy users' individual tastes. For example, the colorant film 106 provides the thermoregulation article 100 with appearance of one or more visible colors selected from red, orange, yellow, green, blue, purple, black, and white. Other colors are contemplated. The colorant film 106 may include colorants that comprise dye molecules and/or colorant particles. In some instances, the colorants are designed to be infrared transparent. The colorant particles may have a diameter less than 4 µm or 3 µm. Example materials for the colorant particles include but not limited to ferric ferrocyanide, iron oxide, or silicon or other known or hereafter developed coloring materials. The colorant film 106 may include up to 10 wt % of typical colorants, or 15-23 wt % of infrared-transparent colorants to remain infrared transparent.

The material selections and layer structures allows the thermoregulation article 100 to have an average reflectivity greater than 0.5 at a wavelength of 0.3-4 µm on at least one side, such that the thermoregulation article 100 can effectively reflect sunlight illuminated on buildings. Further, the thermoregulation article 100 to have an average emissivity less than 0.4 at a wavelength of 4-20 µm on at least one side such that the thermoregulation article 100 can reduce heat absorption when the exterior air temperature is greater than the interior temperature. The combined effects allow the thermoregulation article 100 to keep the buildings cooler when the thermoregulation article 100 is attached to the exterior of the buildings, thus reducing energy consumption for cooling of the buildings.

In some embodiments, the thermoregulation article 100 may further include a connection layer 108 for connecting the thermoregulation article 100 to the exterior of a building. The connection layer 108 may include adhesive or other attachment mechanisms for securing the thermoregulation article 100 to, for example, a wall or a roof of a building.

In an example method for forming the thermoregulation article 100, the metal film 102 may be deposited on the polymer film 104 by vapor deposition methods.

Figure 2:
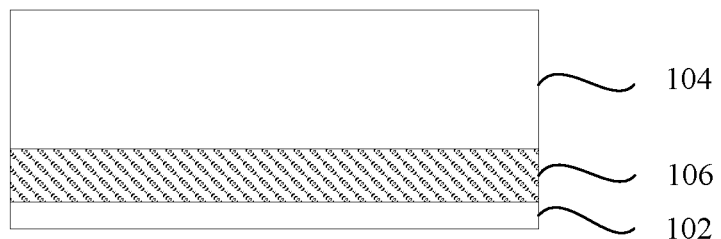
FIG. 2 is a cross-sectional view of another thermoregulation article according to one example embodiment.

FIG. 2 is a cross-sectional view of a thermoregulation article 200 according to one example embodiment. The thermoregulation article 200 includes a metal film 102, a colorant film 106 disposed on the metal film 102, and a polymer film 104 disposed on the colorant film 106. The thermoregulation article 200 has at least one side having an average reflectivity greater than 0.5 at a wavelength of 0.3-4 µm and an average emissivity less than 0.4 at a wavelength of 4-20 µm. The metal film 102, a polymer film 104, and the colorant film 106 of the thermoregulation article 200 are similar to those of the thermoregulation article 100. A detailed description for those films can be referred to those explained in connection with FIG. 1.

In some embodiments, the thermoregulation article 200 may have an average reflectivity greater than 0.6, 0.7, or 0.75 at a wavelength of 0.3-4 µm on at least one side to provide further capability to reflect sunlight. In some embodiments, the thermoregulation article 200 may have an average emissivity less than 0.35, 0.3, 0.25, or 0.2 at a wavelength of 4-20 μm on at least one side to further reduce heat absorption.

The performance of the thermoregulation article 200 is similar or compatible to the thermoregulation article 100. However, because the colorant film 106 of the thermoregulation article 200 are interposed between the polymer film 104 and the metal film 102, the color of the thermoregulation article 200 may last longer and provide better aesthetic and decorative effects for the buildings.

Figure 3:
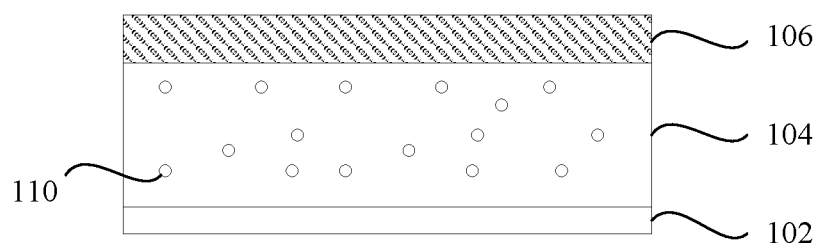
FIG. 3 is a cross-sectional view of yet another thermoregulation article according to one example embodiment.

FIG. 3 is a cross-sectional view of a thermoregulation article 300 according to one example embodiment. The thermoregulation article 300 includes a metal film 102, a polymer film 104 disposed on the metal film 102, a colorant film 106 disposed on the polymer film 104, and a plurality of dielectric particles 110 embedded in the polymer film 104. The thermoregulation article 300 has at least one side having an average reflectivity greater than 0.5 at a wavelength of 0.3-4 μm and an average emissivity less than 0.4 at a wavelength of 4-20 μm. The metal film 102, a polymer film 104, and the colorant film 106 of the thermoregulation article 300 are similar to those of the thermoregulation article 100. A detailed description for those films can be referred to those explained in connection with FIG. 1.

The dielectric particles 110 may further increase the reflectivity of thermoregulation article 300 due to their ability to scatter sunlight. The dielectric particles 110 may include one or more $TiO_2$, ZnO, or $CaCO_3$ and have a diameter less than 4 μm. $TiO_2$, ZnO, or $CaCO_3$ dielectric particles exhibit high solar reflectance and are effective to scatter sunlight away from the building. Further, $TiO_2$ dielectric particles show high absorption at a wavelength about 15-20 μm, while ZnO and $CaCO_3$ dielectric particles exhibit high absorption at a wavelength about 7-8 μm and about 11-12 μm, respectively. A mixture of these particles can produce an average emissivity less than 0.4 at a wavelength of 4-20 μm on at least one side of the thermoregulation article 300. In some embodiments, when the polymer film 104 are compose of nano-fibers, the dielectric particles 110 may be embedded in the pores between tangled nano-fibers.

In some embodiments, the thermoregulation article 300 may have an average reflectivity greater than 0.6, 0.7, or 0.75 at a wavelength of 0.3-4 μm on at least one side to provide further capability to reflect sunlight. In some embodiments, the thermoregulation article 300 may have an average emissivity less than 0.35, 0.3, 0.25, or 0.2 at a wavelength of 4-20 μm on at least one side to further reduce heat absorption.

Figure 4:
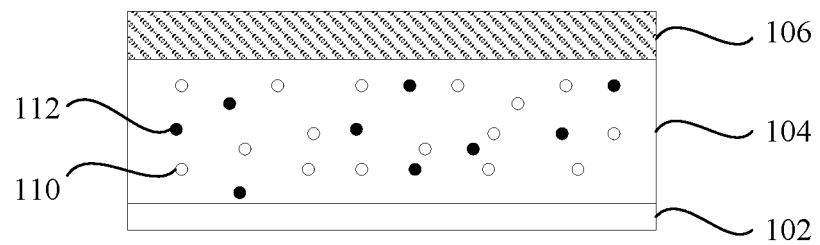
FIG. 4 is a cross-sectional view of yet another thermoregulation article according to one example embodiment.

FIG. 4 is a cross-sectional view of a thermoregulation article 400 according to one example embodiment. The thermoregulation article 400 includes a metal film 102, a polymer film 104 disposed on the metal film 102, a colorant film 106 disposed on the polymer film 104, a plurality of dielectric particles 110 embedded in the polymer film 104, and a plurality of colorants 112 embedded in the polymer film 104. The colorants 112 may include dye molecules and/or colorant particles. The thermoregulation article 400 has at least one side having an average reflectivity greater than 0.5 at a wavelength of 0.3-4 μm and an average emissivity less than 0.4 at a wavelength of 4-20 μm. The metal film 102, a polymer film 104, the colorant film 106, and the dielectric particles 110 of the thermoregulation article 400 are similar to those of the thermoregulation article 300. A detailed description for those structures can be referred to those explained in connection with FIG. 3.

The colorants 112 embedded in the polymer film 104 provide the thermoregulation article 400 with appearance of one or more visible colors selected from red, orange, yellow, green, blue, purple, black, and white. Other colors are contemplated. In some instances, the colorants are configured to be infrared transparent. The colorant particles have a diameter less than 4 μm or 3 μm. Example materials for the colorant particles include but not limited to ferric ferrocyanide, iron oxide, or silicon or other known or hereafter developed coloring materials. Including colorants 112 in the polymer film 104 provide further flexibility to tune the coloration for the thermoregulation article 400.

In some embodiments, the thermoregulation article 400 may have an average reflectivity greater than 0.6, 0.7, or 0.75 at a wavelength of 0.3-4 μm on at least one side to provide further capability to reflect sunlight. In some embodiments, the thermoregulation article 400 may have an average emissivity less than 0.35, 0.3, 0.25, or 0.2 at a wavelength of 4-20 μm on at least one side to further reduce heat absorption.

Figure 5:
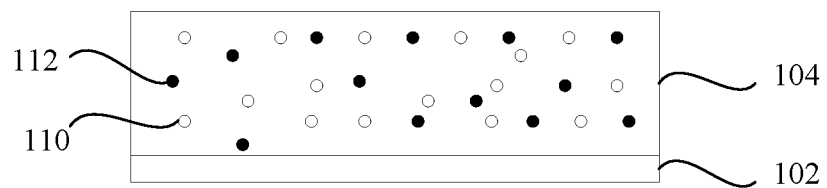
FIG. 5 is a cross-sectional view of yet another thermoregulation article according to one example embodiment.

FIG. 5 is a cross-sectional view of a thermoregulation article 500 according to one example embodiment. The thermoregulation article 500 includes a metal film 102, a polymer film 104 disposed on the metal film 102, a plurality of dielectric particles 110 embedded in the polymer film 104, and a plurality of colorants 112 embedded in the polymer film 104. The colorants 112 may include dye molecules and/or colorant particles. The thermoregulation article 500 has at least one side having an average reflectivity greater than 0.5 at a wavelength of 0.3-4 μm and an average emissivity less than 0.4 at a wavelength of 4-20 μm. In some embodiments, the thermoregulation article 500 may have an average reflectivity greater than 0.6, 0.7, or 0.75 at a wavelength of 0.3-4 μm on at least one side to provide further capability to reflect sunlight. In some embodiments, the thermoregulation article 500 may have an average emissivity less than 0.35, 0.3, 0.25, or 0.2 at a wavelength of 4-20 μm on at least one side to further reduce heat absorption. The thermoregulation article 500 is similar to the thermoregulation article 400 of FIG. 4 except that the thermoregulation article 500 does not include a colorant film 106. In some instances, a density of the colorants 112 embedded in the polymer film 104 of the thermoregulation article 500 is greater than that of the thermoregulation article 400. This simplified structure as shown in FIG. 5 may save cost in manufacturing a thermoregulation article as a colorant film is omitted while providing similar thermoregulation performance.

Figure 6:
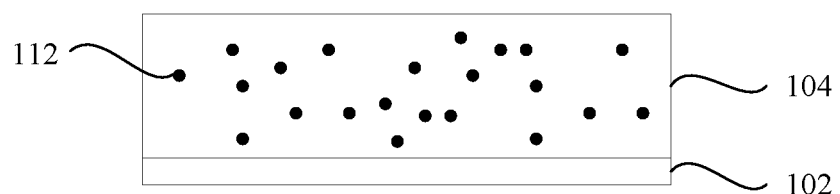
FIG. 6 is a cross-sectional view of yet another thermoregulation article according to one example embodiment.

FIG. 6 is a cross-sectional view of a thermoregulation article 600 according to one example embodiment. The thermoregulation article 600 includes a metal film 102, a polymer film 104 disposed on the metal film 102, and a plurality of colorants 112 embedded in the polymer film 104. The colorants 112 may include dye molecules and/or colorant particles. The thermoregulation article 600 has at least one side having an average reflectivity greater than 0.5 at a wavelength of 0.3-4 μm and an average emissivity less than 0.4 at a wavelength of 4-20 μm. In some embodiments, the thermoregulation article 600 may have an average reflectivity greater than 0.6, 0.7, or 0.75 at a wavelength of 0.3-4 μm on at least one side to provide further capability to reflect sunlight. In some embodiments, the thermoregulation article 600 may have an average emissivity less than 0.35, 0.3, 0.25, or 0.2 at a wavelength of 4-20 μm on at least one side to further reduce heat absorption. The thermoregulation article 600 is similar to the thermoregulation article 500 of FIG. 5 except that the thermoregulation article 600 does not include dielectric particles embedded in the polymer film 104.

Figure 7:
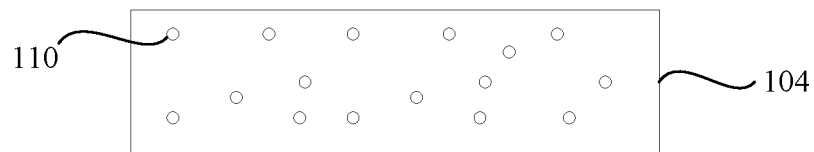
FIG. 7 is a cross-sectional view of yet another thermoregulation article according to one example embodiment.

FIG. 7 is a cross-sectional view of a thermoregulation article 700 according to one example embodiment. The thermoregulation article 700 includes a polymer film 104 and a plurality of dielectric particles 110 embedded in the polymer film 104. The thermoregulation article 700 has at least one side having an average reflectivity greater than 0.5 at a wavelength of 0.3-4 μm and an average emissivity less than 0.4 at a wavelength of 4-20 μm. In some embodiments, the thermoregulation article 700 may have an average reflectivity greater than 0.6, 0.7, or 0.75 at a wavelength of 0.3-4 μm on at least one side to provide further capability to reflect sunlight. In some embodiments, the thermoregulation article 700 may have an average emissivity less than 0.35, 0.3, 0.25, or 0.2 at a wavelength of 4-20 μm on at least one side to further reduce heat absorption. The polymer film 104 and the dielectric particles 110 of the thermoregulation article 700 are similar to those of the thermoregulation article 300 in FIG. 3. A detailed description for those structures can be referred to those explained in connection with FIG. 3.

Figure 8:
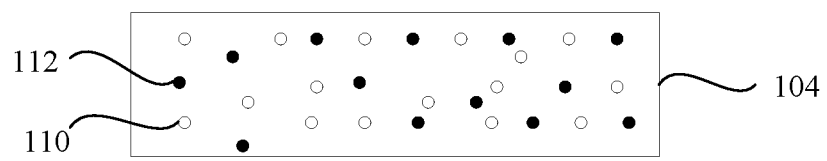
FIG. 8 is a cross-sectional view of yet another thermoregulation article according to one example embodiment.

FIG. 8 is a cross-sectional view of a thermoregulation article 800 according to one example embodiment. The thermoregulation article 800 includes a polymer film 104, a plurality of dielectric particles 110 embedded in the polymer film 104, and a plurality of colorants 112 embedded in the polymer film 104. The colorants 112 may include dye molecules and/or colorant particles. The thermoregulation article 800 has at least one side having an average reflectivity greater than 0.5 at a wavelength of 0.3-4 μm and an average emissivity less than 0.4 at a wavelength of 4-20 μm. In some embodiments, the thermoregulation article 800 may have an average reflectivity greater than 0.6, 0.7, or 0.75 at a wavelength of 0.3-4 μm on at least one side to provide further capability to reflect sunlight. In some embodiments, the thermoregulation article 800 may have an average emissivity less than 0.35, 0.3, 0.25, or 0.2 at a wavelength of 4-20 μm on at least one side to further reduce heat absorption. The polymer film 104, the dielectric particles 110, and the colorants 112 of the thermoregulation article 800 are similar to those of the thermoregulation article 400 in FIG. 4. A detailed description for those structures can be referred to those explained in connection with FIG. 4.

Figure 9:
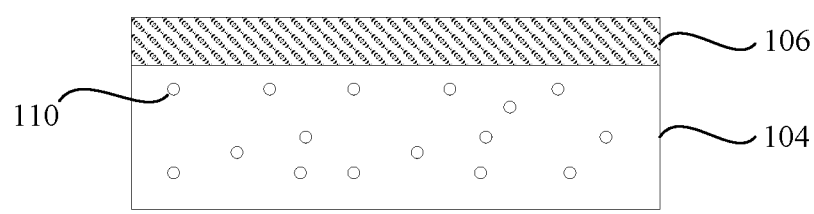
FIG. 9 is a cross-sectional view of yet another thermoregulation article according to one example embodiment.

FIG. 9 is a cross-sectional view of a thermoregulation article 900 according to one example embodiment. The thermoregulation article 800 includes a polymer film 104, a plurality of dielectric particles 110 embedded in the polymer film 104, and a colorant film 106 disposed on the polymer film 104. The thermoregulation article 900 has at least one side having an average reflectivity greater than 0.5 at a wavelength of 0.3-4 μm and an average emissivity less than 0.4 at a wavelength of 4-20 μm. In some embodiments, the thermoregulation article 900 may have an average reflectivity greater than 0.6, 0.7, or 0.75 at a wavelength of 0.3-4 μm on at least one side to provide further capability to reflect sunlight. In some embodiments, the thermoregulation article 900 may have an average emissivity less than 0.35, 0.3, 0.25, or 0.2 at a wavelength of 4-20 μm on at least one side to further reduce heat absorption. The polymer film 104, the dielectric particles 110, and the colorant film 106 of the thermoregulation article 900 are similar to those of the thermoregulation article 300 in FIG. 3. A detailed description for those structures can be referred to those explained in connection with FIG. 3.

It is to be understood that the connection layer 108 as illustrated in FIG. 1 may also be applied to the thermoregulation articles of FIGS. 2-9. The reflectivity throughout this disclosure may be measured by a spectrometer.

In summary, the thermoregulation articles consistent with this disclosure provide high sunlight reflection at a wavelength of 0.3-4 μm, low emissivity at a wavelength of 4-20 μm, and good durability which makes them appropriate for use at the exteriors of buildings. The thermoregulation articles can also be employed in other fields where cooling is needed in hot environments, such as vehicles.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A thermoregulation article comprising:
   a metal film comprising one or more of Al, Ti, Cu, Ag, Au and having a thickness of less than 200 nm;
   a polymer film disposed on the metal film, the polymer film comprising one or more of polyethylene or polypropylene and having a thickness between 150 μm and 1000 μm; and
   a colorant film disposed on the metal film, the colorant film comprising dye molecules and/or colorant particles for up to 10 wt % of the colorant film,
   wherein the colorant film is interposed between the metal film and the polymer film, wherein at least one side of the thermoregulation article has an average reflectivity greater than 0.5 at a wavelength of 0.3-4 μm and an average emissivity less than 0.4 at a wavelength of 4-20 μm.

2. The thermoregulation article of claim 1, wherein the colorant film includes colorants comprising dye molecules and/or colorant particles having a diameter less than 4 μm.

3. The thermoregulation article of claim 2, wherein the colorants are infrared transparent.

4. The thermoregulation article of claim 2, wherein the colorant particles includes one or more of ferric ferrocyanide, iron oxide, or silicon.

5. The thermoregulation article of claim 1, wherein the polymer film includes embedded colorants.

6. The thermoregulation article of claim 1, wherein the polymer film includes embedded dielectric particles.

7. The thermoregulation article of claim 6, wherein the embedded dielectric particles includes one or more of $TiO_2$, ZnO, or $CaCO_3$.

8. The thermoregulation article of claim 7, wherein the embedded dielectric particles has a diameter less than 4 μm.

* * * * *